(12) United States Patent
Fathi et al.

(10) Patent No.: US 11,139,118 B2
(45) Date of Patent: Oct. 5, 2021

(54) ELECTRODES AND CURRENTS THROUGH THE USE OF ORGANIC AND ORGANOMETALLIC HIGH DIELECTRIC CONSTANT MATERIALS IN ENERGY STORAGE DEVICES AND ASSOCIATED METHODS

(71) Applicant: Cleanvolt Energy, Inc., Research Triangle Park, NC (US)

(72) Inventors: Zakaryae Fathi, Raleigh, NC (US); John James Felten, Chapel Hill, NC (US); James Elliott Clayton, Raleigh, NC (US)

(73) Assignee: Cleanvolt Energy, Inc., Research Triangle Park, NC (US)

( * ) Notice: Subject to any disclaimer, the term of this patent is extended or adjusted under 35 U.S.C. 154(b) by 119 days.

(21) Appl. No.: 16/010,741

(22) Filed: Jun. 18, 2018

(65) Prior Publication Data

US 2018/0308644 A1   Oct. 25, 2018

Related U.S. Application Data

(63) Continuation of application No. 14/215,890, filed on Mar. 17, 2014, now Pat. No. 10,102,978.
(Continued)

(51) Int. Cl.
*H01G 11/00* (2013.01)
*H01G 9/00* (2006.01)
(Continued)

(52) U.S. Cl.
CPC .............. *H01G 11/00* (2013.01); *H01B 3/30* (2013.01); *H01G 9/0029* (2013.01); *H01G 9/028* (2013.01)

(58) Field of Classification Search
CPC .......... H01G 11/00; H01G 9/00; H01G 9/028; H01B 3/30
See application file for complete search history.

(56) References Cited

U.S. PATENT DOCUMENTS

| 4,702,987 A | 10/1987 | Fukuchi et al. |
| 4,771,085 A | 9/1988 | Lazaridis |

(Continued)

FOREIGN PATENT DOCUMENTS

| CN | 101215414 A | 7/2008 |
| JP | 2005158895 A | 6/2005 |
| WO | 2012012672 A2 | 1/2012 |

OTHER PUBLICATIONS

Chinese-language Office Action issued in counterpart CN Application No. 201480019113.4 dated Jul. 4, 2017 (eighteen (18) pages).
(Continued)

*Primary Examiner* — Catherine S Branch
(74) *Attorney, Agent, or Firm* — Olive Law Group, PLLC (57) ABSTRACT

Improved electrodes and currents through the use of organic and organometallic high dielectric constant materials containing dispersed conductive particles in energy storage devices and associated methods are disclosed. According to an aspect, a dielectric material includes at least one layer of a substantially continuous phase material comprising a combination of organometallic having delocalized electrons, organic compositions and containing metal particles in dispersed form, in another aspect, the novel material is used with a porous electrode to further increase charge and discharge currents.

13 Claims, 8 Drawing Sheets

Related U.S. Application Data (60) Provisional application No. 61/801,064, filed on Mar. 15, 2013.

(51) Int. Cl.
  *H01G 9/028* (2006.01)
  *H01B 3/30* (2006.01)

(56) References Cited

U.S. PATENT DOCUMENTS

| | | | |
|---|---|---|---|
| 4,784,932 | A | 11/1988 | Nakamura et al. |
| 5,897,912 | A | 4/1999 | Shaikh |
| 6,069,244 | A | 5/2000 | Masuda et al. |
| 7,879,688 | B2 | 2/2011 | Novack et al. |
| 2002/0161074 | A1 | 10/2002 | Zhang et al. |
| 2003/0213408 | A1 | 11/2003 | Mochizuki et al. |
| 2004/0033307 | A1 | 2/2004 | Wu et al. |
| 2004/0060730 | A1 | 4/2004 | Lauf et al. |
| 2006/0030648 | A1 | 2/2006 | Flaim et al. |
| 2006/0049131 | A1 | 3/2006 | Satou |
| 2006/0171099 | A1 | 8/2006 | Barber et al. |
| 2006/0213382 | A1 | 9/2006 | Kanasugi et al. |
| 2006/0256503 | A1 | 11/2006 | Kato et al. |
| 2007/0004844 | A1 | 1/2007 | Clough et al. |
| 2007/0057364 | A1 | 3/2007 | Wang et al. |
| 2007/0080317 | A1 | 4/2007 | Iezumi et al. |
| 2007/0228340 | A1 | 10/2007 | Hayes et al. |
| 2007/0232480 | A1 | 10/2007 | Yanagida et al. |
| 2007/0235694 | A1 | 10/2007 | Nair et al. |
| 2007/0292700 | A1 | 12/2007 | Ayers |
| 2008/0081195 | A1 | 4/2008 | Chung et al. |
| 2008/0145622 | A1 | 6/2008 | Roy et al. |
| 2008/0169530 | A1 | 7/2008 | Koebrugge et al. |
| 2008/0174931 | A1 | 7/2008 | Skamser et al. |
| 2008/0226487 | A1 | 9/2008 | Akimoto et al. |
| 2009/0002919 | A1 | 1/2009 | Goodson et al. |
| 2009/0278447 | A1 | 11/2009 | Saitoh et al. |
| 2009/0281224 | A1 | 11/2009 | Koh et al. |
| 2010/0097739 | A1 | 4/2010 | Prymak |
| 2010/0159259 | A1 | 6/2010 | Kosowsky et al. |
| 2010/0202100 | A1 | 8/2010 | Koh et al. |
| 2010/0239793 | A1 | 9/2010 | Andrews et al. |
| 2011/0252614 | A1 | 10/2011 | Prymak |
| 2011/0255210 | A1 | 10/2011 | Tatemichi et al. |
| 2011/0255211 | A1 | 10/2011 | Koh et al. |
| 2011/0260283 | A1 | 10/2011 | Wu et al. |
| 2012/0006393 | A1 | 1/2012 | Cruz et al. |
| 2012/0104335 | A1 | 5/2012 | Etori et al. |
| 2012/0132898 | A1 | 5/2012 | Pan et al. |
| 2012/0153264 | A1 | 6/2012 | Park et al. |
| 2013/0049530 | A1 | 2/2013 | Koo et al. |
| 2014/0233152 | A1 | 8/2014 | Gardner et al. |

OTHER PUBLICATIONS

Chinese-language Office Action issued in counterpart CN Application No. 201480019113.4 dated Sep. 5, 2016 with English translation (one hundred and forty-two (142) pages).
Chinese-language Office Action issued in counterpart CN Application No. 2014800191134 dated Jan. 29, 2018 with English translation (eight (8) pages).
Final Office Action issued in counterpart U.S. Appl. No. 14/215,890 dated May 22, 2017.
Gordan et al.; (Organic Electronics 5 (2004) 291-297.
Hu et al. (This Solid Films 347, 1999, 299-301).
International Search Report and Written Opinion issued in counterpart PCT Application No. PCT/US2011/044912 dated Apr. 6, 2012.
Nalwa et al. (Journal of Materials Science Letters 2, 1983, 22-24).
Non-Final Office Action issued in counterpart U.S. Appl. No. 14/215,890 dated Dec. 15, 2017.
Non-Final Office Action issued in counterpart U.S. Appl. No. 14/215,890 dated Sep. 14, 2016.
Notice of Allowance issued in counterpart U.S. Appl. No. 14/215,890 dated Jun. 29, 2018.
Notice of Allowance issued in counterpart U.S. Appl. No. 14/215,890 dated May 18, 2018.
Restriction Requirement issued in counterpart U.S. Appl. No. 14/215,890 dated Mar. 16, 2016.
Fifth Office Action issued in counterpart Chinese Application No. 2014800191134 dated Dec. 5, 2018 (nine (9) pages).
Notification to Grant Patent Right for Invention issued in counterpart Chinese Application No. 2014800191134 dated Feb. 19, 2019 (two (2) pages).
Office Action issued in counterpart Chinese Application No. 2014800191134 dated Aug. 1, 2018 (seven (7) pages).
Communication pursuant to Article 94(2) EPC for related European Patent Application No. 11 810 430.6.

ELECTRODES AND CURRENTS THROUGH THE USE OF ORGANIC AND ORGANOMETALLIC HIGH DIELECTRIC CONSTANT MATERIALS IN ENERGY STORAGE DEVICES AND ASSOCIATED METHODS

CROSS REFERENCE TO RELATED APPLICATIONS

This application claims priority to and is a continuation of U.S. patent application Ser. No. 14/215,890, filed Mar. 17, 2014, which claims the benefit of U.S. Provisional Patent Application No. 61/801,064, filed Mar. 15, 2013; the content of which is hereby incorporated herein by reference in its entirety. This application is related to U.S. patent application Ser. No. 13/747,441, filed Jan. 22, 2013, and U.S. Provisional Patent Application No. 61/366,333, filed Jul. 21, 2010; the contents of which are hereby incorporated by reference in their entireties.

TECHNICAL FIELD

The present disclosure relates to the use of metallic dispersions inside organometallics particulates along with organic vehicles to achieve ultra-high charge capacity dielectric material (UHCC-dielectric material), and includes novel organometallic based flexible electrodes to form energy storage devices, associated fabrication methods, and applications of the dielectric material and fabrication methods of the electrode and the dielectric. The dielectric material and the combination of the dielectric material and the novel electrodes enables superior energy storage per unit mass or per surface area given a fixed thickness compared to existing state of the art materials.

BACKGROUND

Electrical energy has been used for providing energy to automobiles. Among the advantages of electrical propulsion are its cleanliness and lack of emissions during driving, high efficiency, quietness, and reliability. During the early years of automotive development electrical propulsion was a formidable competitor to the internal combustion engine.

The internal combustion engine had a decided advantage over electric motors because of the greater onboard energy storage afforded by liquid fuel, especially petroleum distillates and gasoline. Early electric automobiles had only a short range, typically less than 40 miles, followed by a lengthy charging cycle. By comparison, fossil fuel powered vehicles can travel hundreds of miles and need only a quick refueling in order to go another several hundred miles.

The significant drawback of electrically propelled automobiles has been the low energy density of the batteries used as a power source. Early batteries were usually lead acid type, which were very heavy and added to the weight of the vehicle. Over the years, improvements have been made in battery technology to reduce the weight penalty, but progress has not been sufficient to radically change the relative range of electrically powered automobiles versus their gasoline powered counterparts.

Recently, lithium ion batteries have been introduced which reduce the weight and increase the driving range of electric automobiles, but they are very expensive so that their most promising application is in hybrid automobiles where a smaller battery is sufficient. The small battery means that the primary energy source is still a gasoline powered engine.

Capacitors store electric energy. A capacitor usually includes a pair of electrodes that are configured on each side of a dielectric material to increase energy storage. The amount of energy stored by the capacitor is directly proportional to the dielectric constant. Thus, the higher the dielectric constant, the greater the energy storage. Accordingly, efforts are being undertaken to develop dielectric materials with higher dielectric constants so that capacitors and related devices can be used for energy storage for powering devices and machinery including as automobiles.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Considerable work has been done on thin films of copper phthalocyanine which were prepared by sputtering or evaporation. There are several problems with using thin films, among which are a low breakdown voltage due to the thinness of films, and limited ability to make composite films.

Improved electrodes and currents through the use of organic and organometallic high dielectric constant materials with dispersed conductive particles in energy storage devices and associated methods are disclosed. According to an aspect, a dielectric material includes at least one layer of a substantially continuous phase material comprising a combination of organometallic having delocalized electrons, organic compositions and containing metal particles in dispersed form.

DETAILED DESCRIPTION

In accordance with embodiments, one or more experiments and investigations disclosed herein investigated thick film structures with phthalocyanine, therefore, and successfully developed methods of making thick films that would act as capacitors with the ability to store charge hence ultra-high charge capacitors having capacitor like and battery like attributes.

Disclosed herein is the use of the combination of metal particles along with copper phthalocyanine particulates embedded within organic vehicles to form an ultra high dielectric constant k, and capacitors with ultra high capacitance and the ability to hold charge for long periods of time. The addition of metal dispersions contributes to a significant charging and discharging currents. One or more capacitors disclosed herein may be made by dispersing copper particles and copper phthalocyanine and/or silver particles and copper phthalocyanine particulates in a solvents and mixing the dispersion in a printing vehicle to form a copper phthalocyanine dielectric. The copper phthalocyanine dielectric with dispersed metal particles is applied over a conductive solid electrode or a porous electrode of a capacitor to form a thick film. The thick film copper phthalocyanine with dispersed metal particles can also be applied over a novel electrode made of copper phthalocyanine with dispersed metal particles for improved charging currents and discharging currents. The green dielectric layers can be dried from room temperature to 60 to 80° C. and optionally sintered at 150 to 200° C. to form a continuous layer. The preparation steps are repeated if necessary. A top electrode is applied over the bottom phthalocyanine dielectric structure. This method has the advantage that large thickness dielectric layers can be applied, enhancing the charge storage capability and increasing the resistance of the dielectric, whereas conventional methods of creating a copper phthalocyanine dielectric were limited when using an extremely thin dielectric layers prohibiting a large scale polarization and charge storage and not allowing the addition of metallic dispersions. The addition of metallic particles to form a copper phthalocyanine based electrode is also novel and the novel electrode is flexible and allows the film to be cut and stacked to form higher voltage devices.

The copper phthalocyanine material has a behavior that is representative of the metal-phthalocyanine chemistry platform from which high dielectric constants films and devices can be built. Various metal phthalocyanine chemistries were used. An example mode focuses on Cu, Fe and zinc phthalocyanine based chemistries.

The plasticizers and solvents that were used impact the orientation of the crystallite during the coating and drying process. Good voltage discharge results are obtained with ethyl cellulose, poly-methyl-methacrylate and acrylate resin as the organic vehicle. Better metal phthalocyanine particulates alignment was observed using Decalin solvent. Also, the addition of tripropylene glycol in the appropriate amount enables the activation of more dipoles and hence higher capacitance. The addition of metal particles in dispersed form enables the achievement of higher charging current. A novel porous electrode film can influence the current intake by virtue of the surface area that increase the effective charge storage capability. The metal phthalocyanine film was co applied with the electrode film on top of a release film. The co-applied film can be die-cut, stacked and thermally compression bonded to form multilayered charge storage devices.

Introduction and Relevance:

A set of chemistries based on metal-phthalocyanine and related devices that are capable of storing extremely high amounts of charge (far surpassing what is commercially available or published in the literature). The materials are stable and non-hazardous. The processing methods are reliable and devices with ultra high capacitance can be reproduced (from small to large scale). Devices with surface areas from 1 cm×1 cm to 30 cm×10 cm have been built. The application methods are continuous and amenable to scale up via reel to reel techniques. Devices from one layer to 27 layers have been fabricated. The chemistries can be tailored to have devices exhibiting capacitor like behavior or to have dual capacitor and battery like behaviors can be fabricated.

The patent literature reported the use of metal-phthalocyanine material chemistries in discontinuous phases and at high frequencies. Devices containing phthalocyanine in a discontinuous phase cannot build up very high capacitance. Also, the phthalocyanine chemistries do not effectively store charge at high frequencies due to the nature and the relaxation times involved in these chemistries. In other words many of the relaxation mechanisms are frozen in place at high frequency. For this reason, phthalocyanines are not capable of very high dielectric constants or ultra high charge storage once the frequencies are elevated.

Test devices built using metal-phthalocyanine material chemistries stored as much as 15 farads in a 4"×12" device. More typically, 4 to 8 farads in a 3"×3" coupon, and have achieved a maximum of over 60 volts peak. Charge retention is about 2 volts after one hour decay, and we have achieved 1.2 volts after a day. This is from a single layer about 2 to 4 mils in thickness.

Another set of metal-phthalocyanine material chemistries managed to store charge and maintain 0.23 Volts in a single later in 4 mills for a period of 12 months. The metal phthalocyanine material chemistries offer a path for ultra high charge storage. The charging rates and the discharge rates were identified as the area of improvement. The improvements were obtained not by making thinner films but by making thicker films and the non-linear improvements were obtained by adding metal dispersions and also tuning the porosity of the electrodes for improved performance. The discharge rate was increased using porous electrodes that match our dielectric materials to control the behavior at the electrode region.

The academic literature addressed the fundamental conductivity mechanisms of thin film phthalocyanine materials deposited using known semiconductor techniques (among others). The academic studies resolved some of the mechanisms but fell short in terms of achieving neither the high capacitance nor the charge storage that was achieved in the present invention, the main reason being that most people followed conventional wisdom which is that the thinner the dielectric films the higher the capacitance. This is simply not true with the phthalocyanine materials. In fact it is the opposite.

Figure 1:
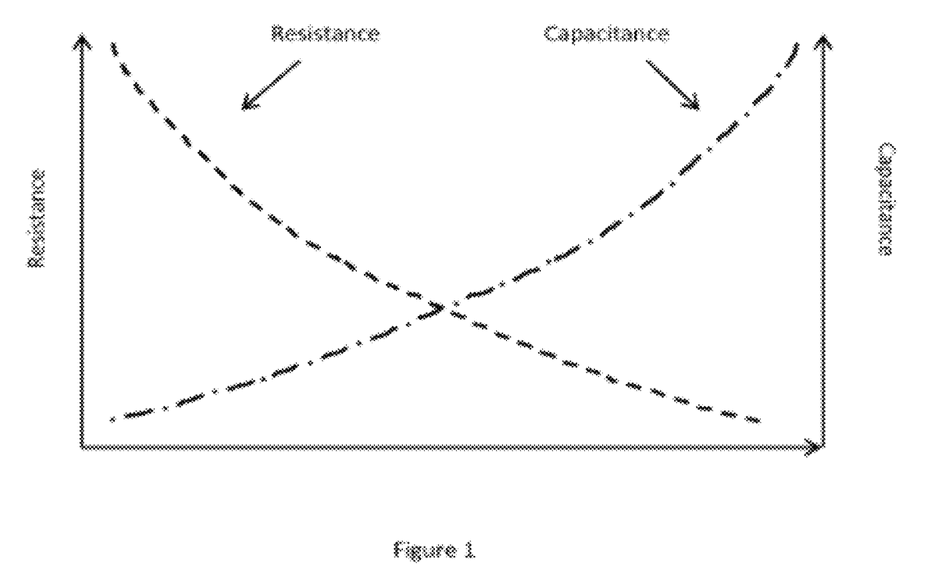
FIG. 1 is a graph showing resistance versus capacitance of an example system.

In accordance with embodiments, techniques are provided based on the combination of chemistries and surface treatments combined with thick film techniques. These novel approaches led to the fabrication of phthalocyanine films that far surpass what has been reported in the open and patent literature. The dielectric behavior of films did better in terms of charge build up from 5 microns to 250 microns in thickness. These thicknesses allowed us to tolerate minor defects and variations in the applications methods (including drawing, spraying, dip coating and others). Surprisingly, the phthalocyanine crystallites have to be in electrical continuity, the materials can be in a continuous phase, the thickness of the film is preferably in microns (not-submicron), multi-layering of sufficiently different phthalocyanine chemistries helps elongate half life (such is the case of having one layer being copper phthalocyanine and the second layer being zinc phthalocyanine or iron phthalocyanine) and processing techniques are necessary to increase capacitance and maintain charge storage. Some of the relaxation mechanisms that can be activated are chemistry and additives dependent. Controlled vs. uncontrolled atmosphere (oxidation of the particulates and the copper metal particles) has an impact on conductivity and the buildup of capacitance. Also in general, we observed that resistance can be increased depending the chemistry. However, capacitance decreased as resistance increased according to the following general behavior described in FIG. 1. The observable trend for resistance decreases with increasing voltage and the capacitance increases with increasing voltage.

Dielectric Materials

Dielectric materials are insulators and exhibit little or no free electron conductivity. Their structure contains molecules, atoms or ions and bound electrons. In complex materials the atoms or molecules may be grouped in ordered or crystal structures. If free electrons can be created at room temperature, their concentrations are very small.

Under an applied external electric field or a voltage, the dielectric material will polarize in an attempt to reduce the net internal field. The rate of polarization will depend on the mobility of the polarizing species or their ability to re-orient to form dipoles. Several different species can contribute to the polarization.

The metal-phthalocyanine family exhibits delocalized π electrons. When the crystallites of the copper phthalocyanine (for example) enter into contact the electrons can move over large distances to result in the formation of a net dipole the magnitude of which depends of the vectorial summation of all the smaller dipoles residing within the aggregates forming the crystallites or the particulates. This mechanism can contribute to a significant portion of the stored energy. However its relaxation time is rapid and the phenomenon is short lived. This behavior is desirable in transportation applications for instance if/when high voltages are required. Special chemistries can be designed for a very rapid voltage drop with little current flow.

In general, the charge built up on the electrode by charging currents freezes the internal and surface polarization effects in the dielectric. When the electrodes are connected across a load, current can flow only as fast as the polarization of the dielectric discharges internally.

In most instances, the dielectric material will be in contact with metal electrodes. In such a case, if the electrodes are reversing electrodes, it means that they conduct using carrier species that will enter the dielectric and will diffuse far into its structure. If the electrodes are blocking, as is most often the case, their electron carriers cannot diffuse into the insulating dielectric and an additional "electrode polarization" will occur. This is typical of dielectric-filled capacitors. However, the metal-phthalocyanine family can carry (intrinsically or by deliberate additions) additional chemical species that contribute to a large electrode polarization with charge species that are not electronic in nature. The mobility of these conductive ionic and anionic species is low and results in a slow decay of the charge build up at the electrode. In effect, the coercive field (inside the dielectric) is strengthened and the electrode polarization effect (also known as space charge polarization) can be enhanced and used advantageously in this case.

Space charge polarization can take place other than at the electrodes. Space charge polarization results from the cumulative charge build up at the interface between dielectric layers having contrasting conductive species. Space charge polarization can be an effective charge storage mechanism. Some of the ultra-capacitors we build are multilayered having at least 2 layers with contrasting phthalocyanine layers with conductive species that do not readily pass from one layer to the next. For example one layer can be copper phthalocyanine rich and the other layer can be zinc phthalocyanine or iron phthalocyanine rich. This effect can further be improved if conductive chemical species (with low mobility) are deliberately added to these metal Pc layers.

Furthermore, the chemical species can be deliberately varied to add to the net polarization mechanisms and these added chemistries can be ions, anions, low molecular weight ionic or anionic species. The polarization, the mobility and the relaxation of each of the species can be tailored by design. What is to be appreciated is that the relaxation mechanisms can be drastically different and therefore can be rendered from rapid to slow depending on the intended use.

The capacitance is written in terms of the dielectric constant of the dielectric material which polarizes under the field generated by the charged capacitor plates, and the area and separation of the capacitor plates.

The response rate of a dielectric capacitor depends on the rate at which the various components of the polarization will decay in the dielectric material. The leakage rate of a dielectric capacitor will depend on any leakage currents that may exist in the dielectric.

Figure 2:
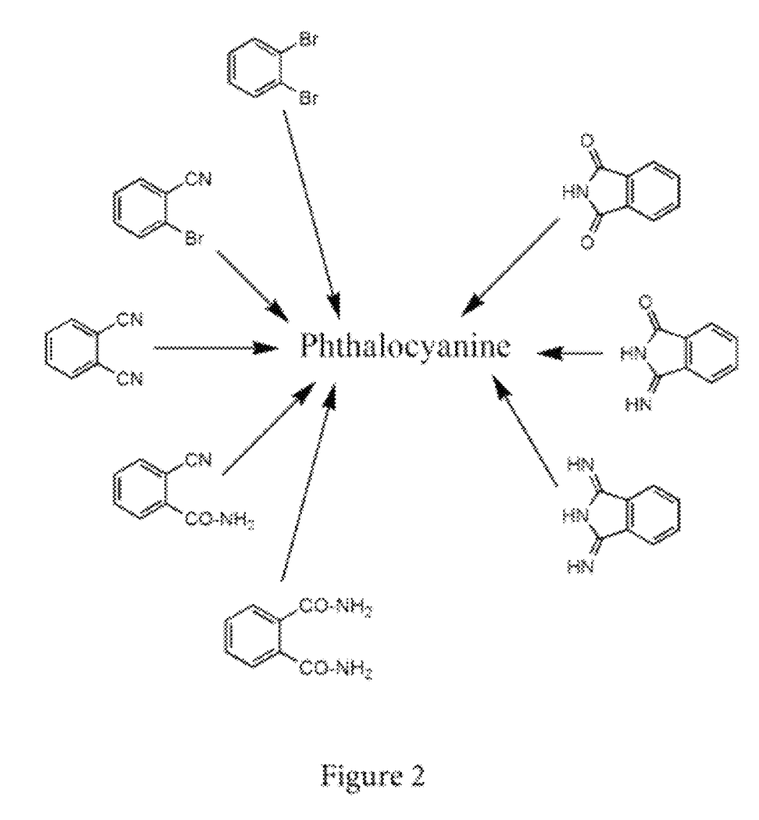
FIG. 2 are structures showing electrostatic binding forces formed between copper phthalocyanine crystallites and low molecular weight species.

The electrostatic binding forces formed between copper phthalocyanine crystallites and low molecular weight species illustrated in FIG. 2. Further increase the storage capacity and further mobilize localized orientations the relaxation of which can be slowed down by the steric hindrance of the surrounding material.

Measurements

Figure 3:
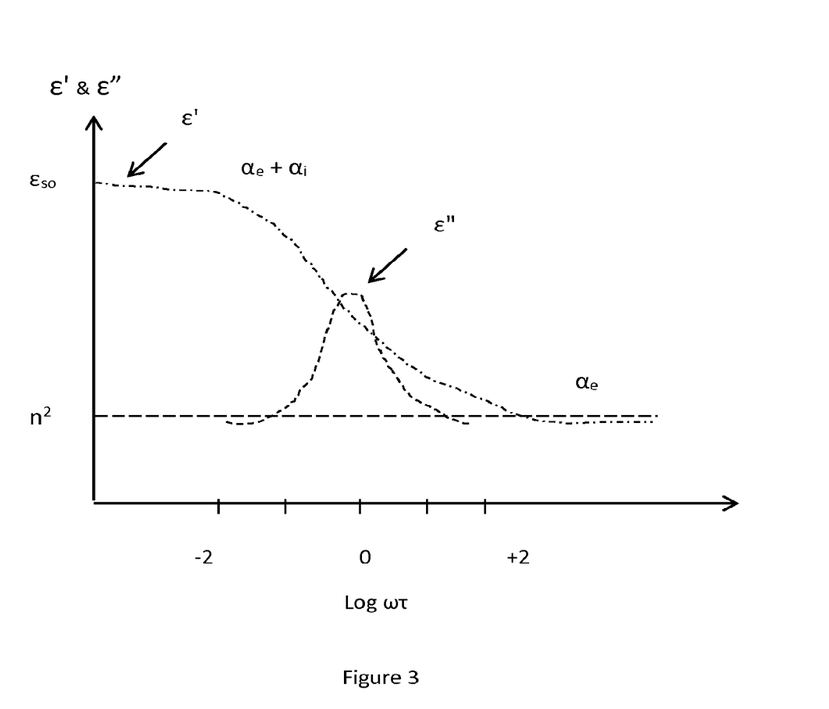
FIG. 3 shows dielectric relaxation measurements that yield the real and imaginary components of the dielectric constant for the dielectric material.

Dielectric relaxation measurements yield the real and imaginary components of the dielectric constant for the dielectric material as illustrated in FIG. 3. The measurements reveal the presence of the different polarizing species. However, due to the limited frequency range of the instruments available, only a part of each relaxation can be studied at a time. Since the response rate of most, but not all, polarizing species can be slowed by decreased temperature, many studies measure the change in polarizability or dielectric constant as a function of frequency and temperature to evaluate a greater portion of the polarization mechanisms.

Lowering the temperature allows an examination of the higher frequency range of the dielectric polarization. Raising the temperature shows the lower frequency region of the relaxation.

This approach works if the polarization rates are not dependent on temperature. However, if the polarization rates are dependent on temperature, as is most often the case, then the results can be ambiguous and difficult to interpret.

Finally, in order to study the critical very slow polarization processes in dielectrics, it is necessary to have instruments that can record data at frequencies well below 1 Hz. This is not often accurate and the measurements are not as useful as one would hope. Some devices can go to 0.01 Hz with reasonable accuracy, but this can still be too high a frequency to measure the diffusion processes and electrode polarization processes.

The best measurement method simulates the performance of the dielectric when in use and it consists of measuring the charging and discharging currents on the dielectric-filled capacitor. The variations in charging and discharging currents with time are then fitted with a variety of exponential functions to account for various relaxation processes. The results give an indication of the rates of response of the various polarization processes active during charging and discharging of the capacitor. The measurements also yield energy storage factors and rate of energy discharge (ramp rate) for the storage function. The method, however, can only give the magnitude of the very fast (sub-second) processes and not their decay rate or relaxation time.

Dielectric constants from dielectric films made with crystallites of metal phthalocyanine according to the present invention have been measured to be in the millions. The highest determined in experimental results exceeds 1 billion. Table 1 below provides an example of a dielectric film with a dielectric constant of eight million ($8 \times 10^{+6}$). This is quite remarkable.

TABLE 1

| k | | Dielectric Constant |
|---|---|---|
| C (capacitance with material) | 8.33E−04 | Farads |
| Co (capacitance in air) | 9.58E−11 | Farads |
| εo air permitivity | 8.80E−12 | — |
| L1 (Length) | 1.65E−02 | |
| L2 (width) | 1.65E−02 | m2 |
| D (Thickness) | 2.50E−05 | m2 |
| Formula Calculation | dielectric constant | 8.70E+06 |
| Using C/C0 | dielectric constant | 8.70E+06 |

Metal Phthalocyanine Material Chemistries

Figure 4:
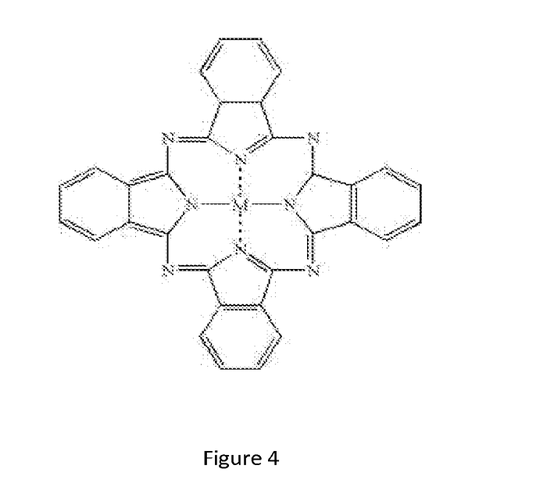
FIG. 4 shows a structure of a building block of the metal phthalocyanine chemistries enabling high capacitance.

Copper phthalocyanine material chemistries have been reported (Patent Application No. 61/366,333 filed on Jul. 21, 2010) to enable the achievement of high dielectric constants. The attribute of most relevance in the phthalocyanine chemistries is the delocalized molecular orbitals innate to this family of chemistries. However, the delocalized molecular orbitals are a necessary but not sufficient condition to the achievement of the ultra high dielectric constants with long relaxation times and ultimately energy storage. The building block of the metal phthalocyanine chemistries enabling high capacitance is illustrated in FIG. 4.

Figure 5:
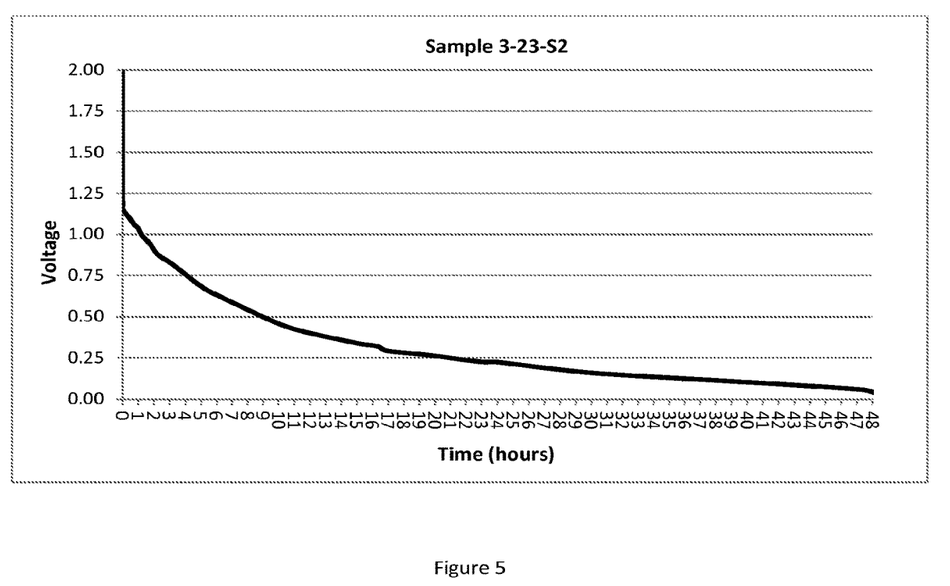
FIG. 5 is a graph showing battery like behavior that stems from permanent polarization.

In addition to the delocalized molecular orbitals nature of the copper phthalocyanine (for example), it was determined that there are some techniques (solvents, organic vehicles, inert atmosphere, chemical additives, treatment processes (like biasing), and surface area of the electrodes) that have to be utilized for the reliable fabrication of ultra high capacitors exhibiting battery like behavior to be achieved. The battery like behavior stems from the permanent polarization that can be imparted to the film, which limits the current output but maintains a steady stream of charge flow over a long period of time as illustrated in FIG. 5.

Figure 6:
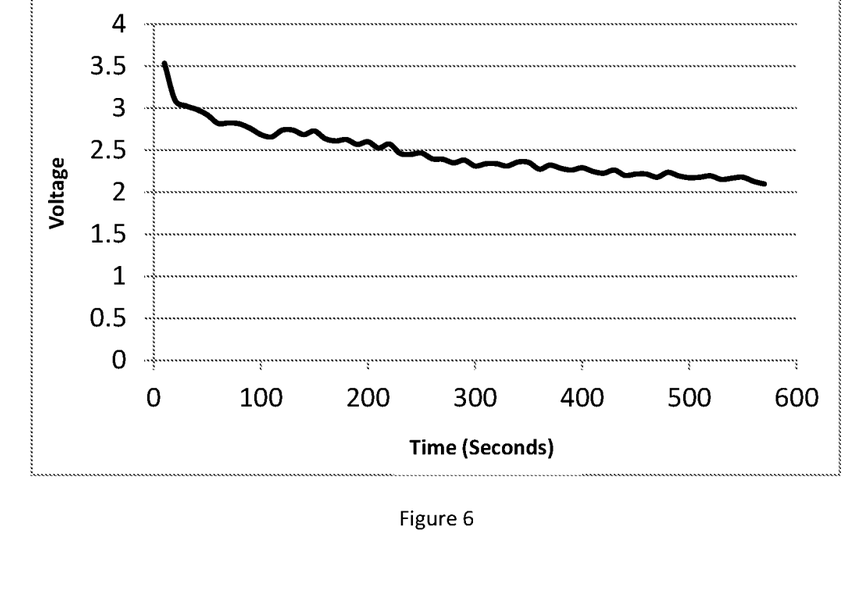
FIG. 6 is a graph showing discharge of a device using Kovar electrodes of 1 cm×1 cm and containing a dielectric layer in the range of 35 microns.

The discharge of a device using Kovar electrodes of 1 cm×1 cm and containing a dielectric layer in the range of 35 microns is shown in FIG. 6. The organic Vehicle was ethyl cellulose.

Permanent Polarization (Long Term Storage in One Chemistry)

Figure 7:
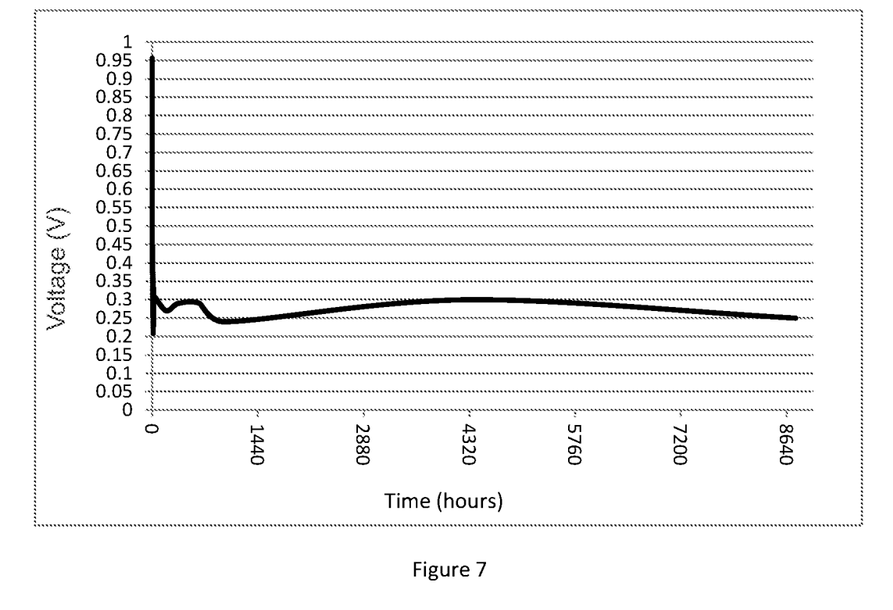
FIG. 7 is a graph showing data plotted over a period of 9,000 hours.

The discharge of a 1 cm by 1 cm device built using a copper phthalocyanine material chemistry using Decalin as a solvent. This solvent is known for wetting metal phthalocyanine pigments very well by virtue of the ring currents that are inherent to its chemistry. The thickness was 40 microns. The film was applied by drawing. The discharge of a 1 cm by 1 cm device built using a copper phthalocyanine material chemistry using Decalin as a solvent. A 60 micron device allowed the charge storage for 12 months. The data plotted over a period of 9,000 hours is shown in FIG. 7. The voltage after 15 months was 0.23V.

There appears to be a recovery of voltage with time. This is most likely due to the charge depletion around the electrode. So that further charge build up is gated by the slow reorientation of some dipoles in combination with diffusion of conductive species contributing to charge build up.

The plasticizers and solvents that were used impact the orientation of the crystallite during the coating and drying process. Better voltage discharge results are obtained with ethyl cellulose as the organic vehicle. Better metal phthalocyanine particulates alignment was observed using Decalin solvent. Also the addition of tripropylene glycol in the appropriate amount enables the activation of more dipoles and hence higher capacitance. Lastly the addition of metal particles in dispersed form enables the achievement of higher charging current. And lastly the porosity of the electrode can influence the current intake by virtue of the surface area that increases the effective charge storage capability.

Relaxation Time Example

Figure 8:
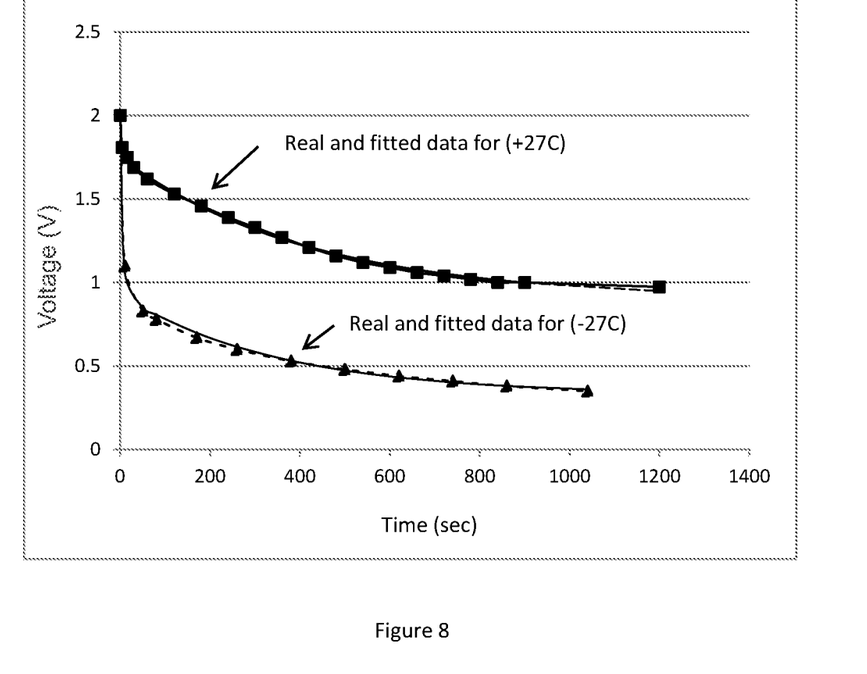
FIG. 8 is a graph showing real data and the fitted data based on an example model.

In one example from one of our early chemistries, prior to adding species that increase permanent voltage and lower leakage rate, the data for voltage relaxation was fitted to the following equation:

$$V(t) = V_{01} \exp(t+\tau_1) V +_{02} \exp(t+\tau_1) V +_\infty$$

where Table 2 shows the results. The real data and the fitted data based on the model is provided in FIG. 8. The data for the (+27° C.), the data from the (−27° C.) are shown and modeled. This is interesting result because there is a permanent residual voltage of 0.33 volts at room temperature and 0.9 volts at low temperature. This proves that the capacitor has a battery like behavior from this residual voltage.

Figure 9:
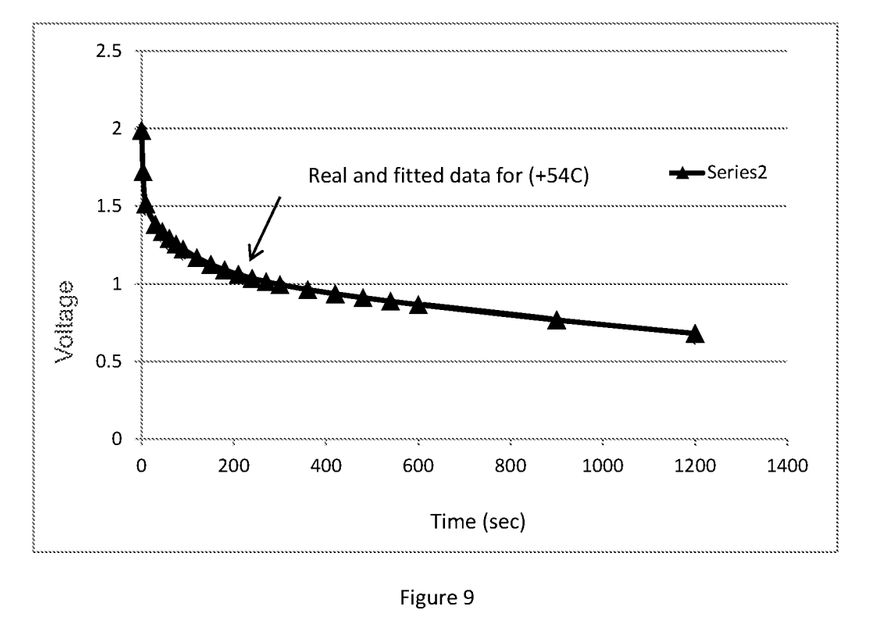
FIG. 9 is a graph showing that material that was charged at high temperature (+54 C) and discharged at room temp was more difficult to fit.

The material that was charged at high temperature (+54 C) and discharged at room temp was more difficult to fit as is illustrated in FIG. 9.

The fast process has:
$\tau^1 = 4$ seconds Vo1=0.5 volts
The mid process seems to have broken up into two processes:
$\tau^{2a}$ 100 seconds Vo2=0.4 volts
$\tau^{2b} = 2,500$ seconds Vo2b=1.1 volts In effect, another relaxation mechanism was triggered by the high temperature treatment during charging and then frozen at room temperature during the discharge.

There are at least two relaxation times indicating a fast and slow process. The relaxation time of the fast process seems to be temperature independent. The slow process has a measurable temperature dependence (activation energy of about 125 kcal/mol) which is similar to diffusion processes.

The differences in amplitudes with $V_{01}$ being much greater at room temperature from the same charging condition indicates that the three processes leak into each other.

by adding silver as a dispersed material inside the dielectric as is illustrated in the table. This composition exhibited enhanced current intake and discharge. Table 2 below illustrates a metal phthalocyanine crystallites along with a metal dispersion.

TABLE 2

|  | Weight | % in a slurry | | | Weight | % after evaporation | | |
|---|---|---|---|---|---|---|---|---|
|  |  |  |  |  |  | Solid | Solid | Solid |
|  | (grams) | W % | Voume | V % | of solids | W % | V | V % |
| Ag | 0.64 | 2.53% | 0.062 | 0.23% | 0.64 | 4.54% | 0.062 | 1.03% |
| BaTiO3 | 0.29 | 1.16% | 0.053 | 0.19% | 0.29 | 2.08% | 0.053 | 0.88% |
| CPC | 0.98 | 3.87% | 0.615 | 2.26% | 0.98 | 6.95% | 0.615 | 10.28% |
| ZPC | 0.49 | 1.94% | 0.307 | 1.13% | 0.49 | 3.47% | 0.307 | 5.14% |
| Elvacite | 0.75 | 2.96% | 0.537 | 1.97% | 0.75 | 5.30% | 0.537 | 8.97% |
| tripropylene glycol | 2.09 | 8.22% | 2.088 | 7.67% | 6.00 | 42.36% | 2.088 | 34.91% |
| Texanol | 2.09 | 8.22% | 2.320 | 8.52% | 5.00 | 35.30% | 2.320 | 38.79% |
| Isopropanol | 18.06 | 71.10% | 21.2467 | 78.03% | 0.00 | 0.00% | 0.000 | 0.00% |
| Total W | 25.40 | 100% | 27.228 | 100% | 14.16 | 100.00% | 5.98 | 100.00% |

(i.e., the permanent or long time voltage can be reduced by the diffusion process and both can be reduced or short circuited by the polarization or electronic process.)

In other chemistries we have added chemistries that forced three and four relaxation mechanisms. These examples are a few on how we can engineer a high dielectric constant with a discharge that can be relaxation dependent and each of the additives can have distinct characteristics in terms of altering the internal leakage as well as enhancing the polarization and the net observable capacitance. The addition of tripropylene glycol in the appropriate amount enables the activation of more dipoles and hence higher capacitance.

Charge and Current Measurements in the Metal Phthalocyanine Based Chemistries Having Metal Particles Dispersed in the Dielectric The metal phthalocyanine based chemistries lead to charge storage devices that are neither a battery nor a capacitor but can exhibit attributes of battery like and capacitor like behavior. The metal phthalocyanine based chemistries first of a new class of charge storage devices, the extension of either capacitor or battery technology is not a linear extension, nor is it intuitive.

The metal-phthalocyanine based chemistries materials exhibit higher resistance at lower voltages. The addition of metal particles in a dispersion format inside the dielectric of metal creates field gradients inside the dielectric. The externally imposed field is broken into sections of lower gradients. The field gradient between metal particles is lower than the main field applied to the external electrodes. In effect the dispersed powders act as miniature electrodes inside the dielectric and increases the resistance of the dielectric material between particles.

Figure 10:
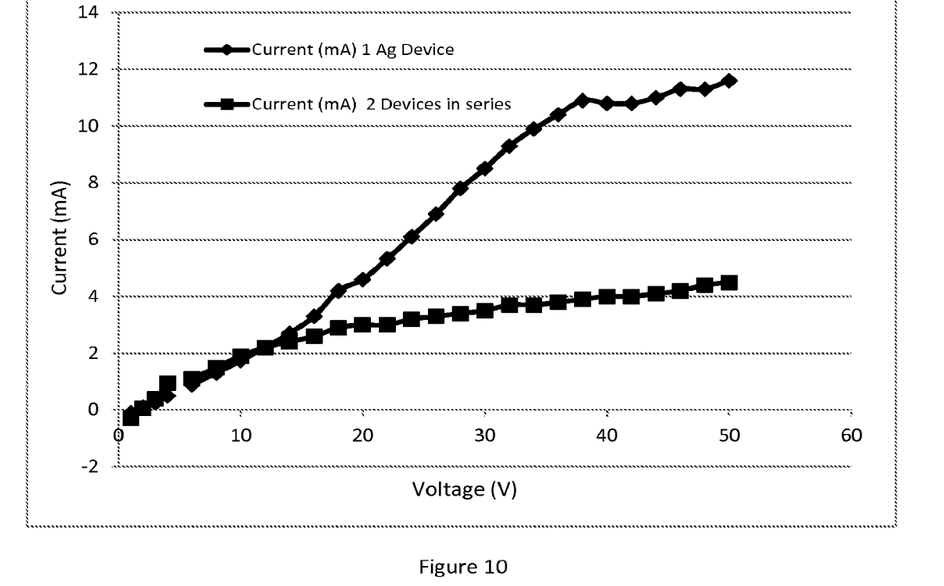
FIG. 10 is a graph showing that current measured for a single layer device containing dispersed silver particles and the current for two devices each containing dispersed silver particles that were stacked on top of one another.
Figure 11:
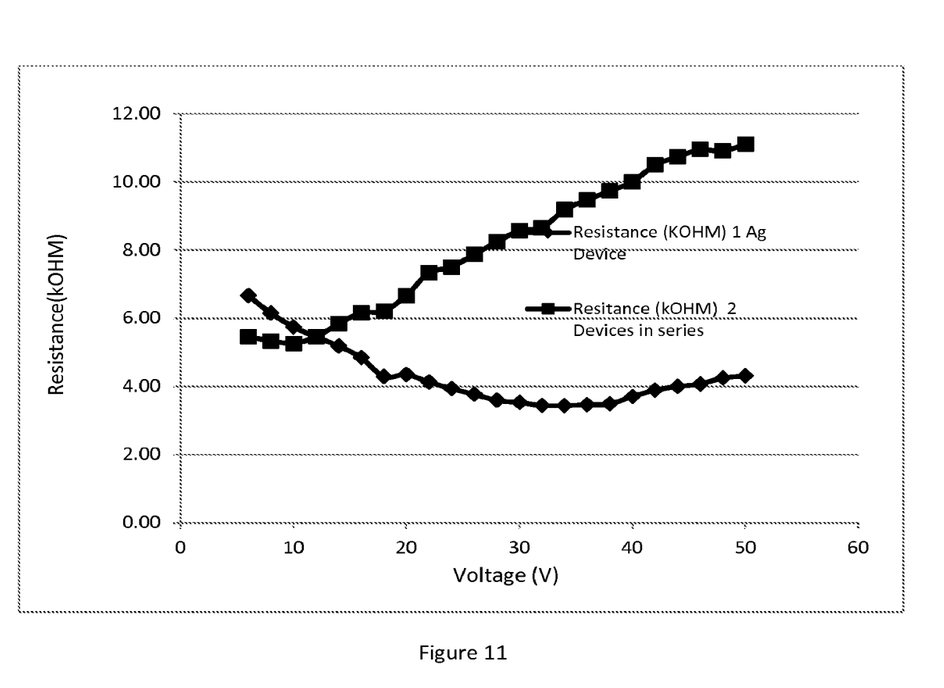
FIG. 11 is a graph showing that resistance measured for a single layer device containing dispersed silver particles and the current for two devices each containing silver particles that were stacked on top of one another.

If one were to add the same metal powder particles in a BaTiO3 dielectric, the capacitance would drop by virtue of lowering the field gradients. However, the addition of the dispersed metal powders results in lowering the gradients and increasing the effective resistance between two metal powder sites is quite beneficial to the metal phthalocyanine based chemistries. This is quite counter-intuitive. For this reason, the performance of charge storage devices based on metal phthalocyanine chemistries is enhanced not impaired. The devices based on metal-phthalocyanine were prepared In this chemistry, the current was measured for a single layer and the current for two devices that were stacked on top of one another as is illustrated in FIG. 10. This is a much higher current compared to dielectric compositions not containing the metal particles. The behavior exhibited here is different than stacking two capacitors together or connecting them in series.

Example for Non-Linear Behavior

If one were to connect ten of the metal phthalocyanine devices of the present disclosure in series, along with ten batteries and ten super-capacitors for comparison purposes, our device would hold one hundred times the energy of a single device, the battery would hold ten times the energy of a single battery, and the super capacitor would contain no more energy than a single device (but 10× the voltage). Thus, as voltage is ramped up, the advantage of the metal phthalocyanine based chemistries becomes more pronounced in terms of energy storage and power delivery.

As an example of charge storage, three identical devices were stacked in a serial manner. Each device had one dielectric layer of about 50 microns in thickness. The usable area for storage in these devices was 3 in×3 in.

The devices were clamped together (which is optional) and then charged using a power supply set at 12V. The current was measured while the capacitors were charging. The current and the time were then tabulated (see Table 3 below) to calculate the charge.

This is quite remarkable in that the series of capacitors acts like a battery rather than 3 capacitors in series. The voltages are additive between the 3 capacitors. Each capacitor exhibits a net intake of 9.5 F per layer.

TABLE 3

| | Charge | |
|---|---|---|
| Time (sec) | I (mA) | F = I (A) * T (sec) |
| 1 | 40.8 | 0.041 |
| 15 | 32 | 0.587 |
| 30 | 27 | 1.472 |
| 45 | 23.7 | 2.613 |
| 60 | 20.7 | 3.945 |
| 120 | 15.5 | 6.117 |
| 180 | 10.2 | 8.43 |
| 240 | 8.5 | 10.674 |

TABLE 3-continued

| | Charge | |
|---|---|---|
| Time (sec) | I (mA) | F = I (A) * T (sec) |
| 300 | 7.38 | 13.056 |
| 600 | 4.8 | 16.71 |
| 1200 | 3.23 | 21.528 |
| 2700 | 2.12 | 28.75 |

Figure 12:
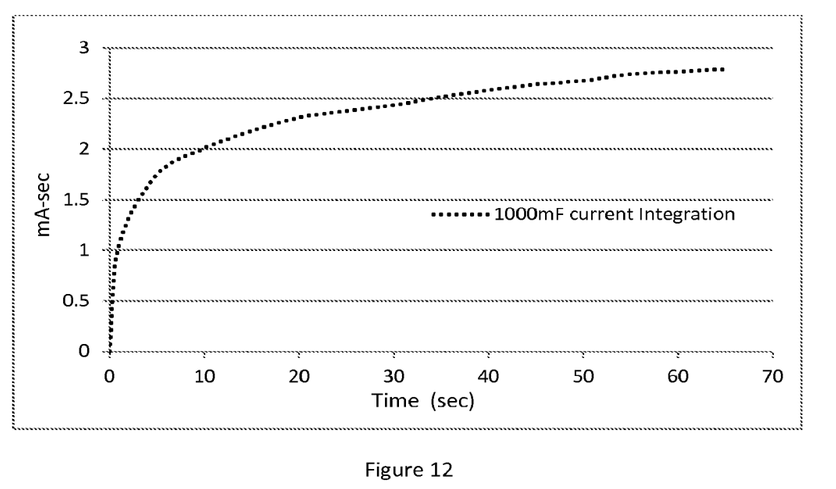
FIGS. 12 and 13 are graphs showing performance of integrated currents in mA-sec.
Figure 13:
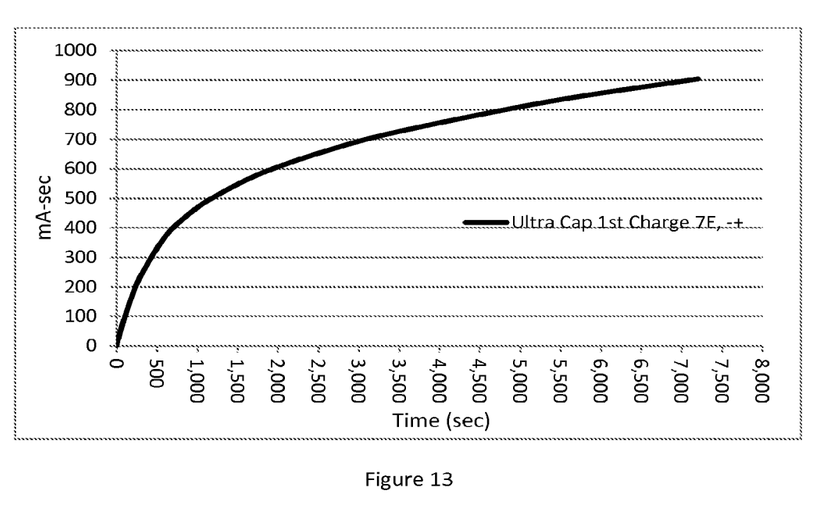
Figure 14:
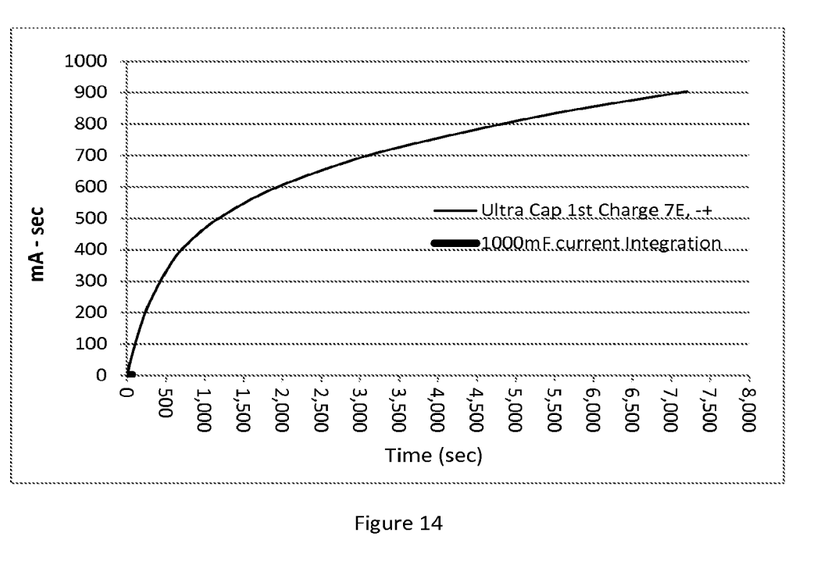
FIG. 14 is a graph showing the merger of the graphs.

Current Integrals: Contrast Between an Electrolytic Capacitor and Metal Phthalocyanine Capacitor An electrolytic capacitor having 1000 mF was charged and discharged through a load. The integrated currents in mA-sec were collected for both devices and contrasted in FIG. 12 and FIG. 13. When the two graphs are merged as is the case of FIG. 14. The graph that is obtained shows the contrast of the large charge storage capability of the devices made with pigments or crystalline metal phthalocyanine chemistries according to the teaching of the present disclosure.

Porous Electrode

A dielectric composition having a metal dispersed within was used according to the recipe in Table 4 below. A copper porous electrode was made using either PMMA or Ethyl cellulose following the composition in Table 5 below.

TABLE 4

| Dielectric (composition-A) | Weight % |
|---|---|
| Copper Pthalocyanine | 7.55% |
| Zinc Pthalocyanine | 3.78% |
| polymethylmethacrylate | 5.67% |
| Tripropylene Glycol | 0.35% |
| Dioctyl Phthalate | 18.42% |
| Copper powder | 7.55% |
| Acetone | 56.67% |

TABLE 5

| Electrode (composition -B) | Weight % |
|---|---|
| Copper | 49.07% |
| polymethylmethacrylate | 1.80% |
| Acetone | 49.13% |

The porous electrode was applied to a 2 mil copper foil and then dried. Subsequently the dielectric composition was applied on top of the film and dried. A storage device was built using this method. The current intake and discharge can be significant depending on the pores and the interaction between the dielectric and the electrode material.

In other methods the material of the electrode is applied to a silicone treated mylar. The electrode material is deposited and dried. Subsequently the dielectric composition was applied on top of the film and dried. Then the co-applied films are released from the silicone treated mylar. The dried film is then cut and stacked to make multilayered devices. The polymethylmethacrylate allows the flow under heat and as such, when the co-applied films are stacked, they undergo a thermal compression bonding during which the polymethylmethacrylate flows to allow electrical communication between the various layers in the stack. A device having 4 to 20 layers was built using this method.

In one embodiment, the electrode material was a mixture of the two chemistries A and B where by 90% of composition-B and 10% of composition-A were mixed together and applied as the electrode film. In a similar way the film were die cut and multilayered charge storage devices were built.

Many modifications and other embodiments of the present disclosure set forth herein will come to mind to one skilled in the art to which the present disclosed subject matter pertains having the benefit of the teachings presented in the foregoing descriptions and the associated drawings. Therefore, it is to be understood that the present subject matter is not to be limited to the specific embodiments disclosed and that modifications and other embodiments are intended to be included within the scope of the appended claims. Although specific terms are employed herein, they are used in a generic and descriptive sense only and not for purposes of limitation.

It will be understood that various details of the presently disclosed subject matter may be changed without departing from the scope of the presently disclosed subject matter. Furthermore, the foregoing description is for the purpose of illustration only, and not for the purpose of limitation.

The novel dielectric materials used in the present invention was made using the following industrially available materials: pigment grade copper phthalocyanine Heliogen Blue L 6955 from BASF located in Vandalia, Ill. Pigment grade copper phthalocyanine Heliogen Blue L 6905 from BASF located in Vandalia, Ill. Pigment grade copper phthalocyanine Heliogen Blue L 7101 from BASF located in Vandalia, Ill. Copper phthalocyanine due content ca 95% from Acros Organics. Copper metal powder with size 2 microns from Culox Technologies Inc. Iron phthalocyanine and Zinc phthalocyanine from Acros Organics. Tripropylene Glycol from Alfa Aesar (a Johnson Mathey company located in Ward Hill, Mass.). Silver powder from Technic Inc (the engineered powders division). Elvacite Acrylic resin from Lucite International located in Cordova, Tenn. Barium Titanate powder from Atlantic Equipment Engineering located in Bergenfield N.J. Dioctyl phthalate, 99% from Acros Organics. Texanol Ester Alcohol from Eastman in Kingsport Tenn. Isopropanol from LabChem Inc located in Pittsburgh, Pa.

What is claimed:

1. A charge storage medium comprising:
at least one semiconductor layer comprising organic molecules with delocalized electrons complexed to a metal, and an organic binder composition; and conductive particles in dispersed form,
wherein the organic molecules are stacked to form particles, and
wherein the particles formed from the stacked organic molecules are substantially electrically interconnected.

2. The charge storage medium of claim 1, wherein the particles formed by stacked organic molecules are semiconductors.

3. The charge storage medium of claim 1, wherein semiconductor particles comprise metal-phthalocyanine particles.

4. The charge storage medium of claim 1, wherein the organic molecules have a phthalocyanine rings containing one or more substituent moiety.

5. The charge storage medium of claim 1, wherein the metal phthalocyanine are selected from the group consisting of copper-phthalocyanine, zinc-phthalocyanine, iron-phthalocyanine, nickel-phthalocyanine, magnesium-phthalocyanine, metal phthalocyanine with ring substitution with halogens and combinations thereof.

6. The charge storage medium of claim 1, further comprising:
   at least one layer comprising organometallic particles of a first type; and
   a second layer comprising organometallic particles of one of the first type or a second type.

7. The charge storage medium of claim 1, further comprising:
   at least one layer comprising organometallic particles of a first type; and
   a second layer comprising organometallic particles of one of the first type or a second type and the at least one layer and the second layer are connected with an inner layer wherein the inner layer has low conductive to semi-conductive properties.

8. An energy storage device comprising:
   at least one semiconductor layer comprising organic molecules with delocalized electrons complexed to a metal, and wherein the organic molecules are stacked to form particles, and wherein the particles are substantially electrically interconnected;
   a first electrode electrically connected to a first side of the at least one semiconductor layer; and
   a second electrode electrically connected to a second side of the at least the second semiconductor layer, wherein the first side substantially opposed the second side.

9. The energy storage device of claim 8, wherein the electrodes are made of conductive materials.

10. The energy storage device of claim 9, wherein the conductive materials are one of metals, metal alloys, carbon base conductors, graphene, activated carbon, carbon nanotubes, conductive polymers, organic polymers doped with carbon, conductive material and conductive material compositions with high surface area, and composited electrodes made of a combination of these materials.

11. The energy storage device of claim 8, wherein the at least one semiconductor layer comprises at least two layers each layer formed of materials from the group consisting of organometallic particles in substantially continuous form, and wherein the at least two layers further comprise an inner layer disposed between each of the at least two layers and the inner layer has insulative to semi-conductive properties.

12. The energy storage device of claim 11, wherein the inner layer is made of a viscous organic based material form having a high polarity and doped with conductive materials comprising silver, copper, gold, graphene, activated carbon, pigments, conductive polymers, organic semiconductors, and/or other conductive materials and material combinations.

13. The charge storage medium of claim 4, wherein the one or more substituent moiety in the phthalocyanine ring is a halogen.

* * * * *